US 10,486,085 B2

(12) United States Patent
Terada et al.

(10) Patent No.: US 10,486,085 B2
(45) Date of Patent: Nov. 26, 2019

(54) OIL SUPPLY APPARATUS FOR VEHICLE

(71) Applicant: AISIN SEIKI KABUSHIKI KAISHA, Kariya-shi, Aichi-ken (JP)

(72) Inventors: Mitsuru Terada, Okazaki (JP); Kazuya Matsushima, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 21 days.

(21) Appl. No.: 15/869,496

(22) Filed: Jan. 12, 2018

(65) Prior Publication Data

US 2018/0214793 A1 Aug. 2, 2018

(30) Foreign Application Priority Data

Jan. 31, 2017 (JP) .................... 2017-015839

(51) Int. Cl.
| | | |
|---|---|---|
| *F01M 1/02* | (2006.01) | |
| *B01D 19/00* | (2006.01) | |
| *F01M 11/02* | (2006.01) | |
| *F01M 11/08* | (2006.01) | |

(52) U.S. Cl.
CPC .......... *B01D 19/0078* (2013.01); *F01M 1/02* (2013.01); *F01M 11/02* (2013.01); *F01M 11/08* (2013.01); *B01D 2221/00* (2013.01)

(58) Field of Classification Search
CPC ... B01D 17/0205; B01D 19/00; F16N 39/002; F01M 11/08
USPC ........... 123/196 R; 95/241; 96/155, 176, 187
See application file for complete search history.

(56) References Cited

U.S. PATENT DOCUMENTS

| | | | | |
|---|---|---|---|---|
| 5,587,068 A | * | 12/1996 | Aho, Jr. ............. | B01D 19/0057 184/6 |
| 2002/0007736 A1 | * | 1/2002 | Hearn ................ | B01D 19/0057 96/209 |
| 2002/0134328 A1 | | 9/2002 | Chiappini et al. | |
| 2004/0173093 A1 | * | 9/2004 | Takahashi .......... | B01D 19/0068 95/30 |
| 2007/0039475 A1 | * | 2/2007 | Unfried ............. | B01D 19/0005 96/219 |
| 2009/0120296 A1 | * | 5/2009 | Saito .................. | B01D 19/0057 96/174 |
| 2014/0140824 A1 | * | 5/2014 | Sheridan ............. | F01D 25/16 415/170.1 |
| 2016/0131245 A1 | * | 5/2016 | Imai .................... | F16H 57/0446 476/8 |
| 2016/0237877 A1 | * | 8/2016 | Sato .................... | F01P 3/08 |

FOREIGN PATENT DOCUMENTS

| | | |
|---|---|---|
| JP | 2004-132192 A | 4/2004 |
| JP | 2010-19098 A | 1/2010 |
| JP | 2015-81546 A | 4/2015 |

* cited by examiner

*Primary Examiner* — Long T Tran
*Assistant Examiner* — James J Kim
(74) *Attorney, Agent, or Firm* — Buchanan Ingersoll & Rooney PC

(57) ABSTRACT

An oil supply apparatus for a vehicle includes: an oil pump that supplies oil in an oil pan that stores the oil circulating in an engine; an oil supply passageway that supplies the oil from the oil pump to a lubricating part and a hydraulic actuating part of the engine; and a bubble separating unit that is provided in the oil supply passageway and separates bubbles contained in the oil.

15 Claims, 3 Drawing Sheets

(SECOND EMBODIMENT)

OIL SUPPLY APPARATUS FOR VEHICLE

CROSS REFERENCE TO RELATED APPLICATIONS

This application is based on and claims priority under 35 U.S.C. § 119 to Japanese Patent Application 2017-015839, filed on Jan. 31, 2017, the entire contents of which are incorporated herein by reference.

TECHNICAL FIELD

This disclosure relates to an oil supply apparatus for a vehicle.

BACKGROUND DISCUSSION

In the related art, there has been known an internal combustion engine (engine) having an oil pump for circulating a lubricant (oil) in the internal combustion engine (e.g., see JP 2010-019098 A (Reference 1)).

The internal combustion engine disclosed in Reference 1 has an oil pan which stores a lubricant, an engine sliding part (lubricating part) through which the lubricant in the oil pan is supplied by an oil pump, and a buffer plate which is provided over the entire area of the internal combustion engine so as to receive the lubricant dropping from the engine sliding part and store the lubricant. In addition, it is considered that the oil is supplied to not only the engine sliding part, but also a hydraulic actuating part. Here, when the lubricant mixed with bubbles is supplied to the hydraulic actuating part, a malfunction of the hydraulic actuating part occurs due to the bubbles. In order to inhibit the problem such as the malfunction of the hydraulic actuating part, the internal combustion engine disclosed in Reference 1 is provided with a lubricant bubble removing device including a vibrating body for removing the bubbles included in the lubricant.

Specifically, in the internal combustion engine disclosed in Reference 1, the vibrating body of the lubricant bubble removing device vibrates the buffer plate such that the lubricant received in the buffer plate is vibrated. At this time, the multiple bubbles contained in the lubricant are aggregated by vibration of the lubricant. Therefore, buoyancy acting on the bubbles is increased, and thus the bubbles, which are aggregated on an oil surface of the lubricant in the buffer plate, float to be released outward from the lubricant in the buffer plate.

However, in the lubricant bubble removing device of the internal combustion engine disclosed in Reference 1, the oil in the buffer plate from which the bubbles are separated is supplied to the hydraulic actuating part and the engine sliding part from the oil pan by the oil pump. For this reason, when bubbles are included in the oil supplied from the oil pump due to a change in temperature of the oil or a change in driving state of the oil pump, there occurs a problem in that the oil including the bubbles is supplied to the hydraulic actuating part. For this reason, there is a demand for an oil supply apparatus for a vehicle which is capable of making it difficult for the oil including bubbles to be supplied to the hydraulic actuating part.

Thus, a need exists for an oil supply apparatus for a vehicle which is not susceptible to the drawback mentioned above.

SUMMARY

An oil supply apparatus for a vehicle according to this disclosure includes: an oil pump that supplies oil in an oil pan that stores the oil circulating in an engine; an oil supply passageway that supplies the oil from the oil pump to a lubricating part and a hydraulic actuating part of the engine; and a bubble separating unit that is provided in the oil supply passageway and separates bubbles contained in the oil.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

First Embodiment

First, a configuration of an oil supply apparatus 1 for a vehicle according to a first embodiment will be described with reference to FIGS. 1 to 3.

(Schematic Configuration of Engine)

Figure 1:
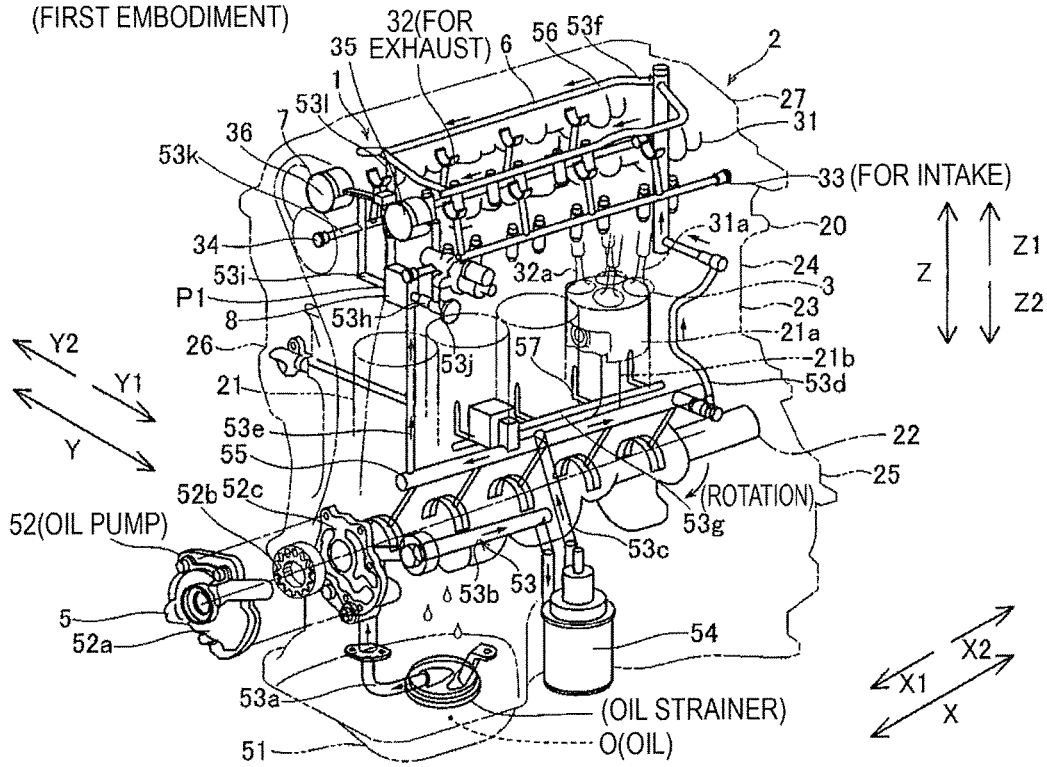
FIG. 1 is a perspective view illustrating a schematic configuration of an engine provided with an oil supply apparatus for a vehicle according to a first embodiment disclosed here.

As illustrated in FIG. 1, an engine 2 for a vehicle (automobile) according to an embodiment disclosed here serves to rotate a crank shaft 22 by continuously repeating one cycle of intake, compression, expansion (combustion), and exhaust by allowing pistons 21a to reciprocate in respective cylinders 21. In addition, the engine 2 serves as a driving source that extracts driving power from the rotation of the crank shaft 22 in order to allow the vehicle (not illustrated) to travel. Here, a direction in which the crank shaft 22 extends is defined as an X direction, and a direction which is orthogonal to the X direction in a horizontal plane is defined as a Y direction. In addition, a vertical direction orthogonal to the X direction and the Y direction is defined as a Z direction.

The engine 2 is provided with an engine main body 20 which includes a cylinder block 23, a cylinder head 24 fixed at a Z1 side of the cylinder block 23, and a crank casing 25 fixed at a Z2 side of the cylinder block 23. The engine main body 20 includes a timing chain cover 26 (hereinafter, referred to as a TCC 26) mounted on a side end portion of the cylinder block 23. In addition, a head cover 27 is mounted on the cylinder head 24.

The pistons 21a, connecting rods 21b, and the crank shaft 22, which generate the driving power, are included in the engine main body 20. Further, a valve mechanism 3 embedded in the cylinder head 24 is included in the engine main body 20. The valve mechanism 3 has intake valves 31a, exhaust valves 32a, and an intake cam shaft 31 and an exhaust cam shaft 32 which control explosion timing of a gaseous mixture in the respective cylinders 21. In addition, the valve mechanism 3 has an intake lash adjuster 33 (hydraulic actuating part 7) which adjusts clearances between the intake valves 31a and the intake cam shaft 31. Further, the valve mechanism 3 has an exhaust lash adjuster 34 (hydraulic actuating part 7) which adjusts clearances between the exhaust valves 32a and the exhaust cam shaft 32. Here, the hydraulic actuating part 7 is a member which is supplied with oil O circulating in the engine 2 and operated by the hydraulic pressure of the supplied oil O to apply pressing force to the outside.

The intake cam shaft 31 is mounted with an intake variable valve timing mechanism 35 (hydraulic actuating part 7, and hereinafter, referred to as an "intake VVT 35"), which displaces rotation in a retarding direction or in an advancing direction. Similarly, the exhaust cam shaft 32 is mounted with an exhaust variable valve timing mechanism 36 (hydraulic actuating part 7, and hereinafter, referred to as an "exhaust VVT 36"), which displaces rotation in the retarding direction or in the advancing direction. Further, the engine main body 20 includes the oil supply apparatus 1 for a vehicle which has therein a circulation device 5 for circulating oil O (engine oil).

As illustrated in FIG. 1, the circulation device 5 includes an oil pan 51 which stores the oil O that circulates in the engine 2, and an oil pump 52 which supplies the oil O in the oil pan 51. The oil pump 52 is rotated using the driving power of the crank shaft 22. In addition, the oil pump 52 draws the oil O from the oil pan 51 into a volume chamber 52b through an intake port 52a, and then discharges the oil O from a discharge port 52c in a state in which a predetermined hydraulic pressure is generated as the volume chamber 52b is contracted.

The circulation device 5 includes a hydraulic circuit section 53 (oil supply passageway) which circulates the oil O in the engine main body 20 by the oil pump 52 and supplies the oil O to lubricating parts 6 and hydraulic actuating parts 7 of the engine 2. The hydraulic circuit section 53 has a first oil passage 53a which connects the oil pan 51 and the intake port 52a of the oil pump 52 to each other, and a second oil passage 53b which connects the discharge port 52c of the oil pump 52 and an oil filter 54 to each other. The hydraulic circuit section 53 has a third oil passage 53c which connects the oil filter 54 and a main oil gallery 55 to each other, a fourth oil passage 53d which extends upward (toward the Z1 side) from one side (X2 side) of the main oil gallery 55, and a fifth oil passage 53e (first oil passageway) which extends upward (toward the Z1 side) from the other side (X1 side) of the main oil gallery 55. In addition, a pair of oil supply pipes 53f, which is mounted with a cam shower 56 (lubricating part 6) that lubricates the intake cam shaft 31 and the exhaust cam shaft 32 by supplying the oil O to the intake cam shaft 31 and the exhaust cam shaft 32, is connected to a downstream end of the fourth oil passage 53d. Further, an oil jet mechanism 57 is mounted on a sixth oil passage 53g that diverges from a central portion of the main oil gallery 55. The oil jet mechanism 57 serves to lubricate the peripheries of the pistons 21a while cooling the pistons 21a by injecting the cooling oil O to the back sides of the pistons 21a by opening valves with predetermined operating pressure.

A bubble separating unit 8, which separates fine bubbles B (bubbles) contained in the oil O, is connected to the downstream end of the fifth oil passage 53e. The hydraulic circuit section 53 has a first VVT oil passage 53h (second oil passageway) which connects the bubble separating unit 8 and the intake VVT 35 to each other, and a second VVT oil passage 53i (second oil passageway) which connects the bubble separating unit 8 and the exhaust VVT 36 to each other. Further, the hydraulic circuit section 53 has a first hydraulic lash adjuster (HLA) oil passage 53j (second oil passageway) which diverges from the first VVT oil passage 53h and is connected to the intake lash adjuster 33, and a second HLA oil passage 53k which diverges from the second VVT oil passage 53i and is connected to the exhaust lash adjuster 34. In addition, the hydraulic circuit section 53 has a seventh oil passage 53l (third oil passageway) which connects the bubble separating unit 8 and the pair of oil supply pipes 53f.

As described above, in the engine 2, the oil O, which is pumped from the oil pan 51 by the oil pump 52, flows along the first to fourth oil passages 53a to 53d and is supplied to the cam shower 56 which is one of the lubricating parts 6. In addition, in the engine 2, the oil O flows along the sixth oil passage 53g, and then is supplied to the oil jet mechanism 57 which is one of the lubricating parts 6. Thereafter, the oil O is dropped by its own weight into the cylinder head 24 and the cylinder block 23, and the oil O reaches the crank casing 25 and returns back to the oil pan 51. Further, in the engine 2, the oil O flows along the first VVT oil passage 53h, the second VVT oil passage 53i, the first HLA oil passage 53j, and the second HLA oil passage 53k, and is supplied to the hydraulic actuating parts 7 such as the intake VVT 35, the exhaust VVT 36, the intake lash adjuster 33, and the exhaust lash adjuster 34.

<Bubble Separating Unit>

Figure 2:
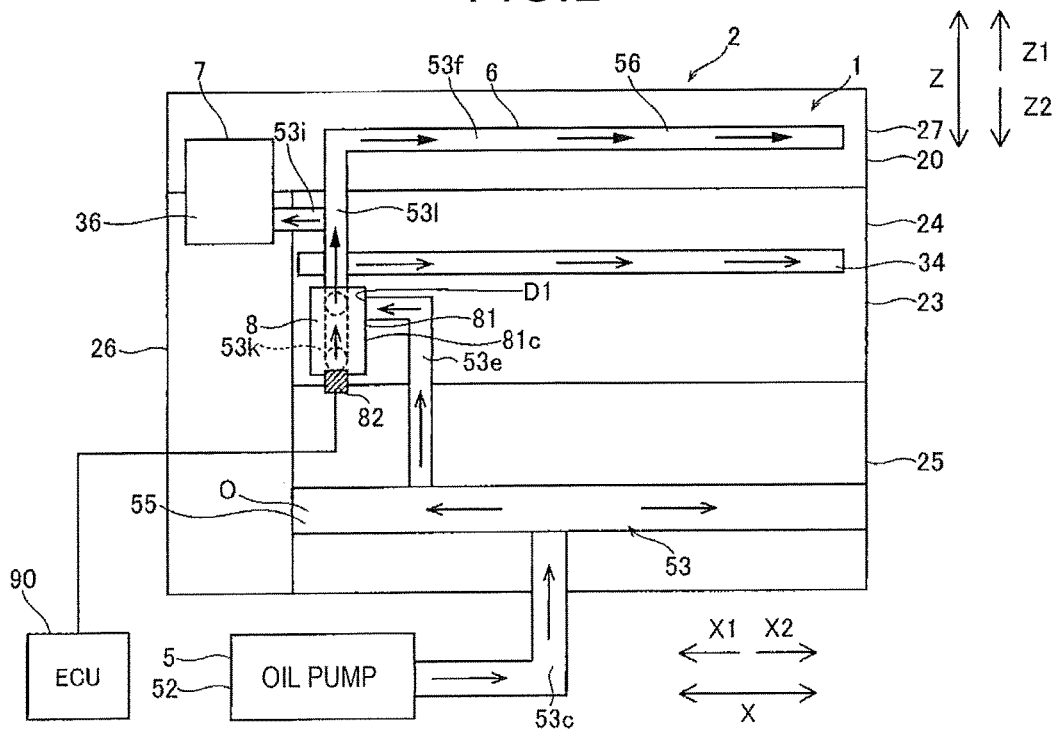
FIG. 2 is a view schematically illustrating a hydraulic circuit section in the engine according to the first embodiment.

As illustrated in FIG. 2, in the engine 2 of the present embodiment, the oil supply apparatus 1 for a vehicle has a bubble separating unit 8 disposed in the hydraulic circuit section 53 in order to separate fine bubbles B contained in the oil O flowing in the hydraulic circuit section 53. Here, the fine bubbles B refer to bubbles having a size equal to or smaller than, for example, about 20 μm. The bubble separating unit 8 is disposed at an upstream side from the hydraulic actuating parts 7 in the hydraulic circuit section 53. The oil O from which the fine bubbles B are separated by the bubble separating unit 8 is supplied to the hydraulic actuating parts 7 (the intake VVT 35, the exhaust VVT 36, the intake lash adjuster 33, the exhaust lash adjuster 34, etc.). In this way, problems caused with respect to the hydraulic actuating parts 7 by the fine bubbles B contained in the oil O are inhibited. In addition, the oil O, which contains a predetermined amount of fine bubbles B separated by the bubble separating unit 8, is supplied to the lubricating part 6 (the cam shower 56). In this way, the oil O containing a predetermined amount of fine bubbles B is supplied to the lubricating part 6, and the oil O from which the fine bubbles B are separated is supplied to the hydraulic actuating part 7. Hereinafter, the bubble separating unit 8 will be described.

As illustrated in FIG. 2, the bubble separating unit 8 has a volume portion 81 which is provided in the hydraulic circuit section 53, and an ultrasonic vibration generating unit 82 (vibration generating unit) which is disposed on the volume portion 81. The volume portion 81 is disposed at a position adjacent to the TCC 26 in the cylinder block 23. The volume portion 81 is formed in a rectangular parallelepiped shape, and has therein a rectangular parallelepiped internal space 83 (see FIG. 3). Here, as illustrated in FIG. 1, the volume of the internal space 83 of the volume portion 81 is smaller than the volume of the oil pan 51. As illustrated in FIG. 3, in the volume portion 81 of the hydraulic circuit section 53, a lateral portion at one side in the Y direction (Y1 side) is a first lateral portion 81a, and a lateral portion at the other side in the Y direction (Y2 side) is a second lateral portion 81b. In the volume portion 81, a lateral portion at a rear side (X2 side) is a third lateral portion 81c (see FIG. 2). In addition, the volume portion 81 has an upper portion 81d at the Z1 side and a lower portion 81e at the Z2 side in the Z direction.

As illustrated in FIG. 2, the volume portion 81 is disposed on a branch portion P1 of the hydraulic circuit section 53 which is divided into the hydraulic actuating part 7 and the lubricating part 6. As illustrated in FIG. 3, the volume portion 81 is connected to a downstream end of the fifth oil passage 53e, and the third lateral portion 81c has a first connecting portion J1 connected to the downstream end of the fifth oil passage 53e. The volume portion 81 is connected to an upstream end of the first VVT oil passage 53h, and the first lateral portion 81a has a second connecting portion J2 connected to the upstream end of the first VVT oil passage 53h. The volume portion 81 is connected to an upstream end of the second VVT oil passage 53i, and the second lateral portion 81b has a third connecting portion J3 connected to the upstream end of the second VVT oil passage 53i. The volume portion 81 is connected to an upstream end of the seventh oil passage 53l, and the second lateral portion 81b has a fourth connecting portion J4 connected to the upstream end of the seventh oil passage 53l.

Figure 3:
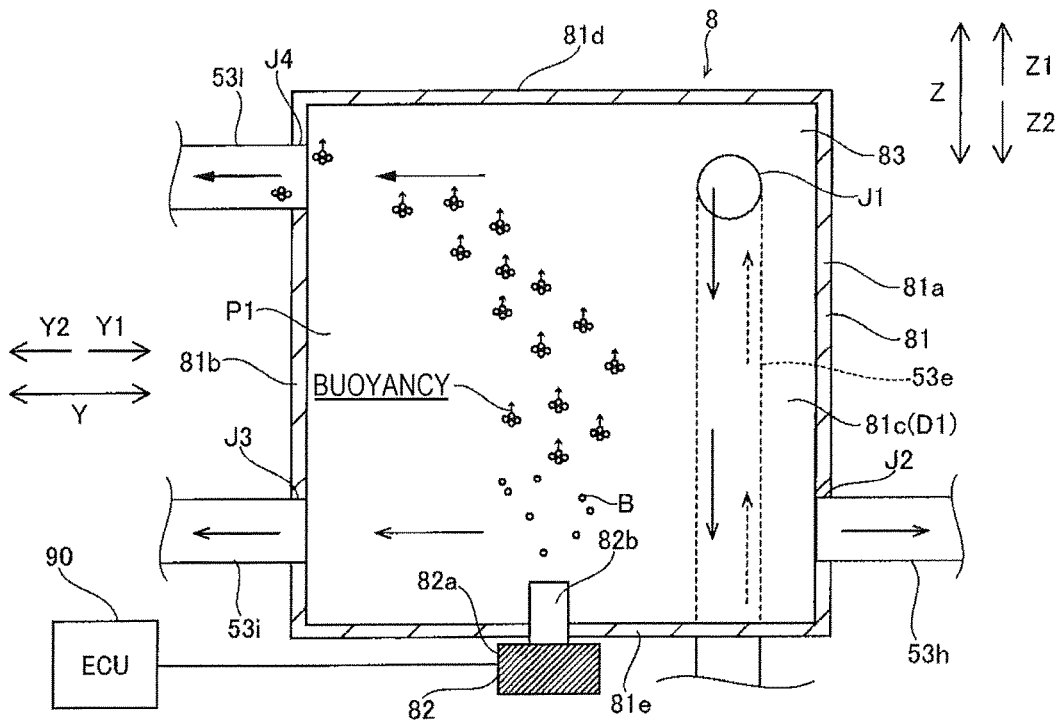
FIG. 3 is a view schematically illustrating a bubble separating unit of the oil supply apparatus for a vehicle according to the first embodiment.

As illustrated in FIG. 3, the second connecting portion J2 and the third connecting portion J3 are disposed at approximately the same height. The second connecting portion J2 and the third connecting portion J3 are disposed below the first connecting portion J1. The fourth connecting portion J4 is disposed above the first connecting portion J1. The fourth connecting portion J4 is disposed above the second connecting portion J2 and the third connecting portion J3.

As illustrated in FIG. 3, the volume portion 81 is configured such that the flow velocity of the oil O flowing in the hydraulic circuit section 53 is decreased in the volume portion 81. Specifically, at least at the boundary portion D1 between the volume portion 81 and the fifth oil passage 53e, the cross-sectional area of the internal space 83 of the volume portion 81 on a YZ plane is larger than the cross-sectional area of the fifth oil passage 53e (the cross-sectional area orthogonal to the direction in which the oil O flows along the fifth oil passage 53e). Here, the cross-sectional area (predetermined flow path cross-sectional area) of the internal space 83 of the volume portion 81 is entirely larger than the cross-sectional area of the fifth oil passage 53e. In addition, the first VVT oil passage 53h has a cross-sectional area (cross-sectional area orthogonal to the direction in which the oil O flows along the first VVT oil passage 53h) smaller than the cross-sectional area of the internal space 83 of the volume portion 81. For this reason, the flow velocity in the first VVT oil passage 53h is higher than the flow velocity in the volume portion 81. The second VVT oil passage 53i has a cross-sectional area (cross-sectional area orthogonal to the direction in which the oil O flows along the second VVT oil passage 53i) smaller than the cross-sectional area of the internal space 83 of the volume portion 81. For this reason, the flow velocity in the second VVT oil passage 53i is higher than the flow velocity in the volume portion 81. The seventh oil passage 53l has a cross-sectional area (cross-sectional area orthogonal to the direction in which the oil O flows along the seventh oil passage 53l) smaller than the cross-sectional area of the internal space 83 of the volume portion 81. For this reason, the flow velocity in the seventh oil passage 53l is higher than the flow velocity in the volume portion 81.

As illustrated in FIG. 3, the ultrasonic vibration generating unit 82 serves to aggregate the fine bubbles B contained in the oil O in the internal space 83 of the volume portion 81 using ultrasonic waves, thereby floating the fine bubbles B. That is, the ultrasonic vibration generating unit 82 vibrates the oil O in the internal space 83 of the volume portion 81 using ultrasonic waves, thereby vibrating the fine bubbles B contained in the oil O. In this case, the fine bubbles B are expanded and contracted by the ultrasonic waves such that Bjerknes force is generated in the fine bubbles B. The multiple fine bubbles B are attracted to one another by the Bjerknes force such that the multiple fine bubbles B are aggregated. Therefore, the buoyancy of the aggregated fine bubbles B is increased such that the fine bubbles B may float upward in the oil O.

Specifically, the ultrasonic vibration generating unit 82 has a piezoelectric element 82a, and a horn portion 82b which resonates in conjunction with the vibration of the piezoelectric element 82a. In addition, the ultrasonic vibration generating unit 82 is electrically connected to an engine control unit (ECU) 90. In this way, the ultrasonic vibration generating unit 82 is controlled by the ECU 90.

As illustrated in FIG. 3, the ultrasonic vibration generating unit 82 is provided in the vicinity of a lower end portion of the volume portion 81 so as to be in contact with the oil O in the volume portion 81. Specifically, the ultrasonic vibration generating unit 82 is disposed at the lower portion 81e. The ultrasonic vibration generating unit 82 is disposed at a central portion of the lower portion 81e in the Y direction. In the ultrasonic vibration generating unit 82, the piezoelectric element 82a is disposed outside the volume portion 81, and the horn portion 82b is in contact with the oil O in the internal space 83 of the volume portion 81.

<Flow of Fine Bubbles>

As illustrated in FIGS. 2 and 3, in the volume portion 81, the oil O containing the fine bubbles B flowing from the fifth oil passage 53e is introduced through the first connecting portion J1. Here, the cross-sectional area of the internal space 83 of the volume portion 81 is larger than the cross-sectional area of the fifth oil passage 53e, and as a result, the flow velocity of the oil O in the volume portion 81 is lower than the flow velocity of the oil O in the fifth oil passage 53e. In the volume portion 81, the oil O in the internal space 83 of the volume portion 81 is vibrated by ultrasonic waves generated by the ultrasonic vibration generating unit 82. In addition, the fine bubbles B contained in the oil O in the internal space 83 of the volume portion 81 are also vibrated by the ultrasonic waves. Therefore, since the fine bubbles B contained in the oil O in the internal space 83 of the volume portion 81 are aggregated, the fine bubbles B move upward in the internal space 83 of the volume portion 81. For this reason, in the internal space 83 of the volume portion 81, a large amount of fine bubbles B is contained in the oil O at the upper side, and a small amount of fine bubbles B is contained in the oil O at the lower side.

As a result, the amount of fine bubbles B contained in the oil O flowing from the internal space 83 of the volume portion 81 to the first VVT oil passage 53h through the second connecting portion J2 is decreased, and as a result, the oil O with a small amount of fine bubbles B is supplied to the intake VVT 35. Further, the oil O with a small amount of fine bubbles B flows to the first HLA oil passage 53j that diverges from the first VVT oil passage 53h, and the oil O is supplied to the intake lash adjuster 33. The amount of fine bubbles B contained in the oil O flowing from the internal space 83 of the volume portion 81 to the second VVT oil passage 53*i* through the third connecting portion J3 is decreased, and as a result, the oil O with a small amount of fine bubbles B is supplied to the exhaust VVT 36. Further, the oil O with a small amount of fine bubbles B flows to the second HLA oil passage 53*k* that diverges from the second VVT oil passage 53*i*, and the oil O is supplied to the exhaust lash adjuster 34. Meanwhile, the amount of fine bubbles B contained in the oil O flowing from the internal space 83 of the volume portion 81 to the seventh oil passage 53*l* through the fourth connecting portion J4 is increased, and as a result, the oil O with a large amount of fine bubbles B is supplied to the cam shower 56. Here, as the oil O is released from the cam shower 56, a large amount of fine bubbles B is released to the outside from the oil O.

Effect of First Embodiment

In the first embodiment, it is possible to obtain the following effects.

In the first embodiment, as described above, the bubble separating unit 8 is disposed in the hydraulic circuit section 53 that supplies the oil O from the oil pump 52 to the lubricating parts 6 and the hydraulic actuating parts 7. Therefore, even though the fine bubbles B are contained in the oil O in the hydraulic circuit section 53 due to a change in temperature of the oil O or a change in driving state of the oil pump 52, the fine bubbles B contained in the oil O are capable of being separated by the bubble separating unit 8 before the oil O is supplied to the lubricating parts 6 and the hydraulic actuating parts 7. As a result, it is possible to make it difficult for the oil O containing the fine bubbles B to be supplied to the hydraulic actuating parts 7.

In the first embodiment, the bubble separating unit 8 is disposed in the hydraulic circuit section 53 in which the amount of oil O is smaller than the amount of oil O in the buffer plate which is formed over the entire area of an upper portion of the oil pan 51. Therefore, it is possible to separate the fine bubbles B contained in the oil O by the bubble separating unit 8 in the hydraulic circuit section 53 in which the amount of oil O is smaller than that in the buffer plate which is formed over the entire area of the upper portion of the oil pan 51 and has a large amount of oil O. As a result, it is possible to use the bubble separating unit 8 having low power output that is lower than that used for separating the fine bubbles B in the oil O by the bubble separating unit 8 in the buffer plate that stores a large amount of oil O, and as a result, it is possible to inhibit deterioration in fuel economy of the engine 2 by inhibiting an increase in load of the engine 2.

In the first embodiment, the bubble separating unit 8 includes a volume portion 81 which is provided in the hydraulic circuit section 53, and an ultrasonic vibration generating unit 82 which is disposed in the volume portion 81. Therefore, the bubble separating unit 8 includes a volume portion 81 that has a cross-sectional area larger than the cross-sectional area of the hydraulic circuit section 53. For this reason, since the cross-sectional area of the volume portion 81 is larger than the cross-sectional area of the hydraulic circuit section 53, it is possible to slow down the flow of the oil O flowing to the volume portion 81. In addition, the oil O of which the flow is slowed down is vibrated by the ultrasonic vibration generating unit 82, such that vibration may be applied to the oil O for a longer period of time, and as a result, it is possible to easily float the fine bubbles B by aggregating the fine bubbles B contained in the oil O. As a result, it is possible to efficiently separate the fine bubbles B contained in the oil O.

In the first embodiment, the volume portion 81 is disposed on the branch portion P1 of the hydraulic circuit section 53 which is divided into the hydraulic actuating part 7 and the lubricating part 6. Further, the volume portion 81 is configured to supply the hydraulic actuating part 7 with the oil O from which the fine bubbles B are separated, and the volume portion 81 is configured to supply the lubricating part 6 with the oil O which contains a predetermined amount of separated fine bubbles B. Therefore, the oil O from which the fine bubbles B are separated is supplied to the hydraulic actuating part 7, and the oil O which contains a predetermined amount of separated fine bubbles B is supplied to the lubricating part 6. As a result, since the oil O from which the fine bubbles B are separated is supplied to the hydraulic actuating part 7, it is possible to inhibit a problem from occurring by the fine bubbles B in the hydraulic actuating part 7. In addition, the oil O, which contains a predetermined amount of separated fine bubbles B, is supplied to the lubricating part 6. Therefore, it is possible to use the oil O containing the separated fine bubbles B for the lubricating part 6 that is hardly affected by the fine bubbles B in comparison with the hydraulic actuating part 7, and as a result, it is possible to effectively utilize the separated fine bubbles B.

In the first embodiment, the second connecting portion J2 and the third connecting portion J3 are disposed below the first connecting portion J1. Here, the oil O from which the fine bubbles B are separated flows at the lower side of the volume portion 81. Therefore, it is possible to cause the oil O from which the fine bubbles B are separated to easily flow into the second connecting portion J2 and the third connecting portion J3. As a result, it is possible to further inhibit a problem from occurring by the fine bubbles B contained in the oil O in the hydraulic actuating part 7.

In addition, in the first embodiment, the fourth connecting portion J4 and the first connecting portion J1 are disposed at approximately the same height. Here, since the aggregated fine bubbles B float in the oil O, the oil O containing the fine bubbles B flows at the upper side in the volume portion 81. Therefore, it is possible to cause the oil O containing the fine bubbles B to easily flow into the fourth connecting portion J4 disposed at approximately the same height as the first connecting portion J1. As a result, since the oil O containing the fine bubbles B is easily supplied to the lubricating part 6, it is possible, to that extent, to effectively inhibit the oil O containing the fine bubbles B from flowing into the first VVT oil passage 53*h* and the second VVT oil passage 53*i*.

In the first embodiment, the cross-sectional area of the boundary portion D1 between the volume portion 81 and the fifth oil passage 53*e* is larger than the cross-sectional area of the fifth oil passage 53*e*. Therefore, since the cross-sectional area of the boundary portion D1 between the volume portion 81 and the fifth oil passage 53*e* is larger than the cross-sectional area of the fifth oil passage 53*e*, it is possible to reduce, at the boundary portion D1, the flow velocity of the oil O flowing from the fifth oil passage 53*e*. In addition, the oil O having the flow velocity reduced at the boundary portion D1 acts as resistance against the oil O which flows from the fifth oil passage 53*e* and has a high flow velocity, and as a result, it is possible to reduce the flow velocity of the oil O flowing from the fifth oil passage 53*e*. Therefore, since the flow velocity of the oil O in the volume portion 81 may be further reduced, the oil O may be vibrated for a long time by the ultrasonic vibration generating unit 82, and as a result, it is possible to more efficiently separate the fine bubbles B in the oil O.

In the first embodiment, the bubble separating unit 8 is disposed at the upstream side from the hydraulic actuating parts 7 in the hydraulic circuit section 53. Therefore, it is possible to reliably separate the fine bubbles B in the oil O to be supplied to the hydraulic actuating part 7. As a result, it is possible to inhibit a problem from occurring by the fine bubbles B contained in the oil O in the hydraulic actuating part 7.

In the first embodiment, the hydraulic actuating parts 7 include the intake VVT 35, the exhaust VVT 36, the intake lash adjuster 33, and the exhaust lash adjuster 34. Therefore, it is possible to reliably separate the fine bubbles B in the oil O to be supplied to the intake VVT 35, the exhaust VVT 36, the intake lash adjuster 33, and the exhaust lash adjuster 34. As a result, it is possible to inhibit problems from occurring by the fine bubbles B contained in the oil O in the intake VVT 35, the exhaust VVT 36, the intake lash adjuster 33, and the exhaust lash adjuster 34.

In the first embodiment, the lubricating parts 6 include a cam shower 56 for supplying the oil O to the intake cam shaft 31 and the exhaust cam shaft 32. Therefore, the oil O containing the fine bubbles B can be supplied from the cam shower 56 to the intake cam shaft 31 and the exhaust cam shaft 32. As a result, since it is possible to use the oil O containing the separated fine bubbles B for the cam shower 56 that is hardly affected by the fine bubbles B in comparison with the hydraulic actuating part 7, it is possible to effectively utilize the separated fine bubbles B.

In the first embodiment, the horn portion 82*b* of the ultrasonic vibration generating unit 82 is provided to be in contact with the oil O in the volume portion 81. Therefore, it is possible to more easily vibrate the fine bubbles B contained in the oil O in comparison with the case in which the fine bubbles B contained in the oil O in the volume portion 81 are indirectly vibrated. As a result, it is possible to aggregate the fine bubbles B contained in the oil O with lower power output lower than that required for indirectly vibrating the fine bubbles B contained in the oil O in the volume portion 81.

Second Embodiment

Next, a second embodiment will be described with reference to FIGS. 4 to 6. Unlike the first embodiment, in the second embodiment, descriptions will be made on an example in which an ultrasonic vibration generating unit 282 of the bubble separating unit 8 is disposed at an upper portion 281*d* of a volume portion 281. In addition, in the drawings, constituent elements similar to the constituent elements in the first embodiment are denoted by the same reference numerals as the constituent elements in the first embodiment, and detailed descriptions thereof will be omitted.

Figure 4:
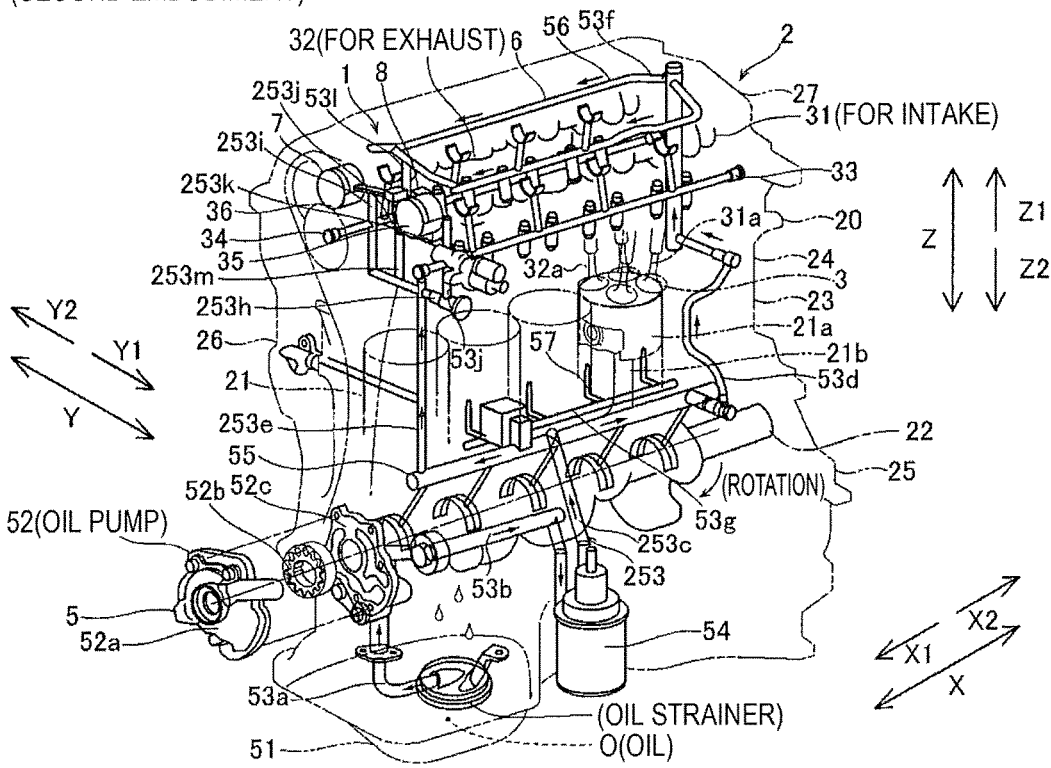
FIG. 4 is a view illustrating a schematic configuration of an engine provided with an oil supply apparatus for a vehicle according to a second embodiment.

As illustrated in FIG. 4, the downstream end of the fifth oil passage 53*e* is divided into a first VVT oil passage 253*h* and a second VVT oil passage 253*i*. A hydraulic circuit section 253 has an eighth oil passage 253*m* that diverges from the second VVT oil passage 253*i*. As illustrated in FIG. 5, the downstream end of the eighth oil passage 253*m* is connected to the bubble separating unit 8. In addition, as illustrated in FIG. 6, the hydraulic circuit section 253 has a first HLA oil passage 253*j* which connects the bubble separating unit 8 and the intake lash adjuster 33 to each other, and a second HLA oil passage 253*k* which connects the bubble separating unit 8 and the exhaust lash adjuster 34 to each other. Further, as illustrated in FIG. 5, the hydraulic circuit section 253 has the seventh oil passage 53*l* which connects the bubble separating unit 8 and the pair of oil supply pipes 53*f* to each other.

<Bubble Separating Unit>

Figure 6:
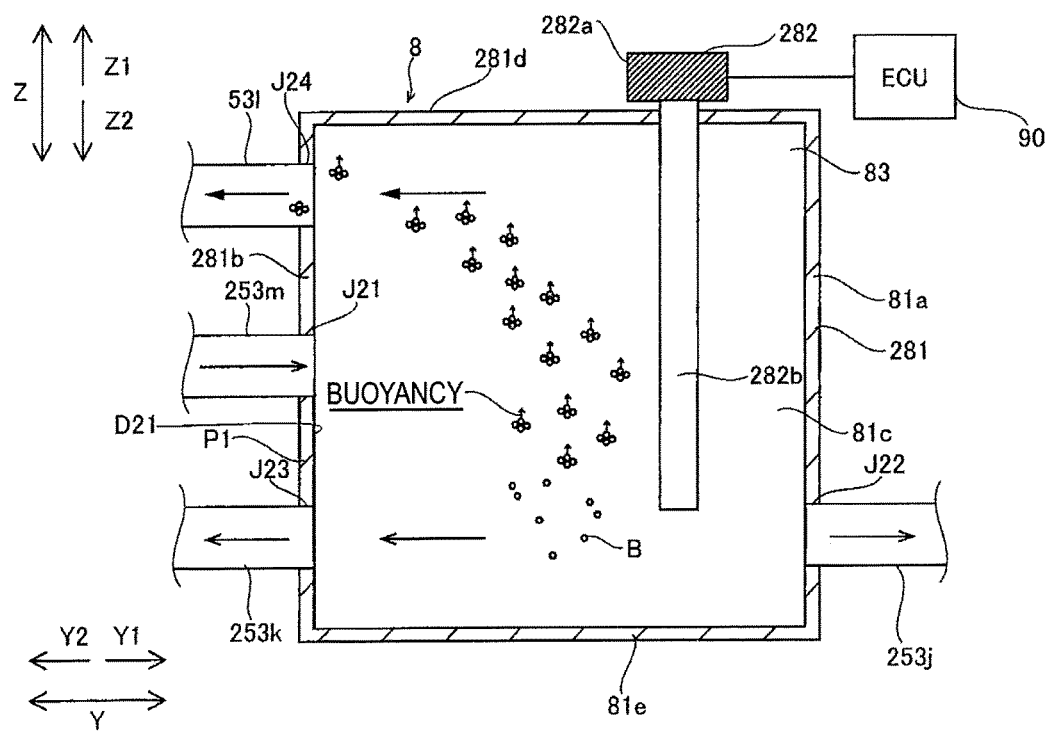
FIG. 6 is a view schematically illustrating a bubble separating unit of the oil supply apparatus for a vehicle according to the second embodiment.

As illustrated in FIG. 6, a second lateral portion 281*b* of the volume portion 281 has a first connecting portion J21 connected to the downstream end of the eighth oil passage 253*m*. In this case, the second lateral portion 281*b* is a boundary portion D21 between the eighth oil passage 253*m* and the volume portion 281. The volume portion 281 is connected to the upstream end of the first HLA oil passage 253*j*, and a first lateral portion 281*a* has a second connecting portion J22 connected to the upstream end of the second HLA oil passage 253*k*. The volume portion 281 is connected to the upstream end of the second HLA oil passage 253*k*, and the second lateral portion 281*b* has a third connecting portion J23 connected to the upstream end of the second HLA oil passage 253*k*. The volume portion 281 is connected to the upstream end of a seventh oil passage 253*l*, and the second lateral portion 281*b* has a fourth connecting portion J24 connected to the upstream end of the seventh oil passage 253*l*.

As illustrated in FIG. 6, the second connecting portion J22 and the third connecting portion J23 are disposed below the first connecting portion J21. The fourth connecting portion J24 is disposed above the first connecting portion J21.

Figure 5:
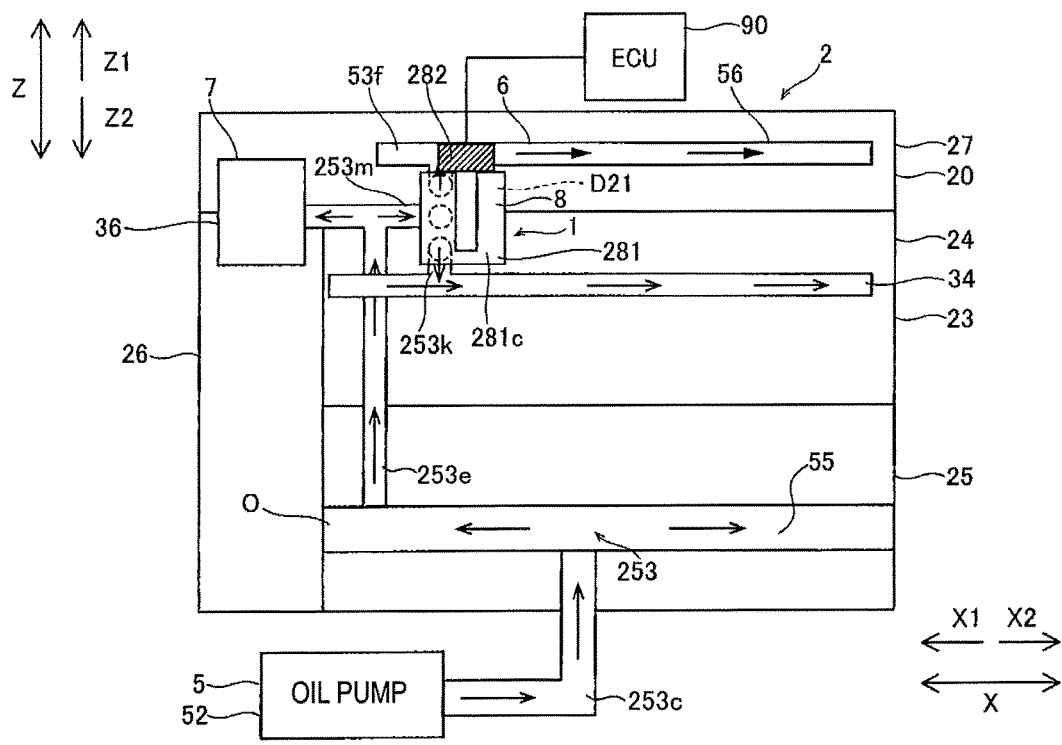
FIG. 5 is a view schematically illustrating a hydraulic circuit section in the engine according to the second embodiment.

As illustrated in FIG. 5, the ultrasonic vibration generating unit 282 is provided in the vicinity of the upper end portion of the volume portion 281 so as to be in contact with the oil O in the volume portion 281. Specifically, as illustrated in FIG. 6, the ultrasonic vibration generating unit 282 is disposed at the upper portion 281*d*. The ultrasonic vibration generating unit 282 is disposed at a position that deviates from a central portion of the upper portion 281*d* in the Y direction. In the ultrasonic vibration generating unit 282, a piezoelectric element 282*a* is disposed outside the volume portion 281, and a horn portion 282*b* is in contact with the oil O in the internal space 283 of the volume portion 281.

<Flow of Fine Bubbles>

As illustrated in FIGS. 5 and 6, in the volume portion 281, the oil O containing the fine bubbles B flowing from the eighth oil passage 253*m* is introduced through the first connecting portion J21. Here, a cross-sectional area of the internal space 283 of the volume portion 281 on an XZ plane is larger than a cross-sectional area (cross-sectional area orthogonal to a direction in which the oil O flows along the eighth oil passage 253*m*) of the eighth oil passage 253*m*, and as a result, a flow velocity of the oil O in the volume portion 281 is lower than a flow velocity of the oil O in the eighth oil passage 253*m*. In the volume portion 281, the oil O in the internal space 283 of the volume portion 281 is vibrated by ultrasonic waves generated by the ultrasonic vibration generating unit 282. In addition, the fine bubbles B contained in the oil O in the internal space 283 of the volume portion 281 are also vibrated by the ultrasonic waves. Therefore, since the fine bubbles B contained in the oil O in the internal space 283 of the volume portion 281 are aggregated, the fine bubbles B move upward in the internal space 283 of the volume portion 281. For this reason, in the internal space 283 of the volume portion 281, a large amount of fine bubbles B is contained in the oil O at the upper side, and a small amount of fine bubbles B is contained in the oil O at the lower side.

The amount of fine bubbles B contained in the oil O flowing from the internal space 283 of the volume portion 281 to the first HLA oil passage 253*j* through the second connecting portion J22 is decreased, and as a result, the oil O with a small amount of fine bubbles B is supplied to the intake lash adjuster 33. The amount of fine bubbles B contained in the oil O flowing from the internal space 283 of the volume portion 281 to the second HLA oil passage 253*k* through the third connecting portion J23 is decreased, and as a result, the oil O with a small amount of fine bubbles B is supplied to the exhaust lash adjuster 34. The amount of fine bubbles B contained in the oil O flowing from the internal space 283 of the volume portion 281 to the seventh oil passage 253*l* through the fourth connecting portion J24 is increased, and as a result, the oil O with a large amount of fine bubbles B is supplied to the cam shower 56. As described above, the oil O with a large amount of fine bubbles B is supplied to the lubricating part 6, and the oil O containing a small amount of fine bubbles B is supplied to the hydraulic actuating part 7. Further, the other configurations of the second embodiment are identical to those of the first embodiment.

Effect of Second Embodiment

The following effects may be obtained in the second embodiment.

In the second embodiment, an ultrasonic vibration generating unit 282 of the bubble separating unit 8 is disposed at the upper portion 281*d* of the volume portion 281, as described above. Therefore, the ultrasonic vibration generating unit 282 can be fixed to the volume portion 281 by allowing the ultrasonic vibration generating unit 282 to access from above the volume portion 281 after the engine 2 is mounted in the vehicle. In addition, maintenance and replacement can be easily performed even after the ultrasonic vibration generating unit 282 is fixed. Further, the other effects of the second embodiment are similar to those of the first embodiment.

<Modification>

It should be considered that all of the disclosed embodiments are illustrative but not limitative. The scope of this disclosure is defined by the appended claims instead of the description of the embodiments and includes all alterations (modifications) within the meanings and scope equivalent to the appended claims.

For example, the example in which the shape of the internal space 83 (283) of the volume portion 81 (281) is a rectangular parallelepiped shape has been described in the first and second embodiments, but this disclosure is not limited thereto. For example, the shape of the internal space of the volume portion may be a spherical shape. That is, the internal space of the volume portion may have any shape as long as the shape is suitable for the shape of the volume portion.

In the first embodiment, the fourth connecting portion J4 and the first connecting portion J1 are disposed at approximately the same height, but this disclosure is not limited thereto. In this disclosure, the fourth connecting portion may be disposed above the first connecting portion. In this case, the first connecting portion is disposed between the second connecting portion and the third connecting portion, and the fourth connecting portion.

In the first and second embodiments, the volume portion 81 (281) is configured to slow down the flow velocity of the oil O flowing along the fifth oil passage 53*e* (253*e*), but this disclosure is not limited thereto. In this disclosure, the volume portion may be configured to temporarily store the oil flowing from the fifth oil passage.

In the first and second embodiments, the bubble separating unit 8 includes the ultrasonic vibration generating unit 82 (282), but this disclosure is not limited thereto. In this disclosure, the bubble separating unit may not include the ultrasonic vibration generating unit. Here, because the bubbles in the oil are lighter in weight than the oil, the bubbles easily move upward even though the bubbles are not aggregated by the vibration generating unit. As a result, it is possible to move the bubbles contained in the oil upward only by the volume portion even though the bubble separating unit does not include the vibration generating unit. Therefore, it is possible to separate the bubbles in the oil without using driving power, and as a result, it is possible to more simplify the configuration of the bubble separating unit.

In the first and second embodiments, the bubble separating unit 8 includes the ultrasonic vibration generating unit 82 (282) that generates ultrasonic waves using the piezoelectric element 82*a* (282*a*), but this disclosure is not limited thereto. In this disclosure, the ultrasonic vibration generating unit may be configured to generate ultrasonic waves by using configurations in addition to the piezoelectric element.

In the first and second embodiments, the hydraulic actuating parts 7 include the intake VVT 35, the exhaust VVT 36, the intake lash adjuster 33, and the exhaust lash adjuster 34, but this disclosure is not limited thereto. In this disclosure, for example, the hydraulic actuating part may be a chain tensioner or a cam chain tensioner.

In the first and second embodiments, the lubricating parts 6 include the cam shower 56, but this disclosure is not limited thereto. In this disclosure, for example, the lubricating part may be a chain jet mechanism for injecting oil to a chain or an oil jet mechanism for injecting oil to a piston.

In the first and second embodiments, the ultrasonic vibration generating unit 82 (282) vibrates the oil O as the horn portion 82*b* (282*b*) is in direct contact with the oil O in the volume portion 81 (281), but this disclosure is not limited thereto. In this disclosure, the ultrasonic vibration generating unit may indirectly vibrate the oil in the volume portion.

In the first and second embodiments, the single bubble separating unit 8 is disposed in the hydraulic circuit section 53 (253), but this disclosure is not limited thereto. In this disclosure, multiple bubble separating units may be disposed in the hydraulic circuit section.

An oil supply apparatus for a vehicle according to this disclosure includes: an oil pump that supplies oil in an oil pan that stores the oil circulating in an engine; an oil supply passageway that supplies the oil from the oil pump to a lubricating part and a hydraulic actuating part of the engine; and a bubble separating unit that is provided in the oil supply passageway and separates bubbles contained in the oil.

In the oil supply apparatus for a vehicle according to this disclosure, as described above, the bubble separating unit is disposed in the oil supply passageway that supplies the oil from the oil pump to the lubricating part and the hydraulic actuating part. Therefore, even though the bubbles are contained in the oil in the oil supply passageway due to a change in temperature of the oil or a change in driving state of the oil pump, the bubbles contained in the oil can be separated by the bubble separating unit before the oil is supplied to the lubricating part and the hydraulic actuating part. As a result, it is possible to make it difficult for the oil containing the bubbles to be supplied to the hydraulic actuating part.

In the oil supply apparatus for a vehicle, it is preferable that the bubble separating unit includes a volume portion provided in the oil supply passageway and having a predetermined flow path cross-sectional area.

With this configuration, instead of the buffer plate formed over the entire area of the upper portion of the oil pan, the bubble separating unit includes the volume portion having a predetermined flow path cross-sectional area, and the cross-sectional area of the volume portion is set to be larger than a cross-sectional area of the oil supply passageway. Thus, it is possible to slow down the flow of the oil flowing into the volume portion, and as a result, it is possible to efficiently separate the bubbles contained in the oil.

In the oil supply apparatus for a vehicle, it is preferable that the bubble separating unit includes a vibration generating unit disposed in the volume portion.

With this configuration, the bubble separating unit is configured to separate the bubbles in the oil using the vibration generating unit with respect to the volume portion including a small amount of oil in comparison with a large amount of oil over the entire area of the buffer plate which is provided over the entire area of the internal combustion engine and has a comparatively large area. As a result, since it is possible to dispose the vibration generating unit with power output lower than that in the case in which the vibration generating unit is disposed on the buffer plate, it is possible to inhibit deterioration in fuel economy of the engine by controlling an increase in load with respect to the engine. In addition, it is possible to slow down the flow of the oil flowing into the volume portion by setting the cross-sectional area of the volume portion to be larger than the cross-sectional area of the oil supply passageway. In addition, by vibrating the oil, the flow of which is slowed down, by the vibration generating unit, it is possible to apply the vibration to the oil for a longer period of time, and as a result, it is possible to cause the bubbles contained in the oil to be aggregated so as to be easily floated.

In this case, it is preferable that the volume portion is disposed at a branch portion of the oil supply passageway which is divided into the hydraulic actuating part and the lubricating part, and the volume portion is configured to supply the hydraulic actuating part with the oil from which the bubbles are separated, and supply the lubricating part with the oil containing a predetermined amount of separated bubbles.

With this configuration, in the oil supply apparatus for a vehicle, the oil from which the bubbles are separated is supplied to the hydraulic actuating part, and the oil containing a predetermined amount of separated bubbles is supplied to the lubricating part. Therefore, since the oil from which the bubbles are separated is supplied to the hydraulic actuating part, it is possible to inhibit a problem from occurring by the bubbles in the hydraulic actuating part. In addition, since it is possible to use the oil containing the separated bubbles for the lubricating part that is hardly affected by the bubbles in comparison with the hydraulic actuating par by supplying the oil containing a predetermined amount of separated bubbles to the lubricating part, it is possible to effectively utilize the oil containing the separated bubbles.

In the oil supply apparatus for a vehicle having the volume portion, it is preferable that the oil supply passageway includes: a first oil passageway that supplies the oil from the oil pump to the volume portion; a second oil passageway that connects the volume portion and the hydraulic actuating part to each other; and a third oil passageway that connects the volume portion and the lubricating part to each other, and a connecting portion between the second oil passageway and the volume portion is disposed below a connecting portion between the first oil passageway and the volume portion.

Here, since the aggregated bubbles float in the oil, the oil from which bubbles are separated flows downward in the volume portion. In this disclosure, when the connecting portion between the second oil passageway and the volume portion is disposed as described above, it is possible to cause the oil from which the bubbles are separated, to easily flow into the connecting portion between the volume portion and the second oil passageway connected to the hydraulic actuating part. As a result, it is possible to further inhibit a problem from occurring by the bubbles contained in the oil in the hydraulic actuating part.

In the oil supply apparatus for a vehicle, it is preferable that a connecting portion between the third oil passageway and the volume portion is disposed at a same height as or above the connecting portion between the first oil passageway and the volume portion.

Here, since the aggregated bubbles float in the oil, the oil containing the bubbles flows upward in the volume portion. Therefore, when the connecting portion between the third oil passageway and the volume portion is disposed as described above, it is possible to cause the oil containing the bubbles to easily flow into the connecting portion between the volume portion and the third oil passageway connected to the lubricating part. As a result, since the oil containing the bubbles is easily supplied to the lubricating part, it is possible to effectively inhibit, to that extent, the oil containing the bubbles from flowing into the second oil passageway.

In the oil supply apparatus for a vehicle in which the oil supply passageway has the first oil passageway, it is preferable that a cross-sectional area of a boundary portion between the volume portion and the first oil passageway is larger than a cross-sectional area of the first oil passageway.

With this configuration, since the cross-sectional area of the boundary portion between the volume portion and the first oil passageway is larger than the cross-sectional area of the first oil passageway, a flow velocity of the oil flowing from the first oil passageway can be decreased at the boundary portion between the volume portion and the first oil passageway. In addition, the oil, the flow velocity of which is reduced at the boundary portion, acts as resistance against the oil which flows from the first oil passageway and has a high flow velocity, and as a result, it is possible to further reduce the flow velocity of the oil flowing from the first oil passageway. Therefore, since the flow velocity of the oil in the volume portion may be further reduced, the oil can be vibrated for a long time by the vibration generating unit, and as a result, it is possible to more efficiently separate the bubbles in the oil by the bubble separating unit.

In this disclosure, the following configurations are conceivable with respect to the oil supply apparatus for a vehicle.

In the oil supply apparatus for a vehicle, it is preferable that the bubble separating unit is disposed at an upstream side from the hydraulic actuating part in the oil supply passageway.

In the oil supply apparatus for a vehicle, it is preferable that the hydraulic actuating part includes a variable valve timing mechanism and a lash adjuster.

In the oil supply apparatus for a vehicle including the lubricating part, it is preferable that the lubricating part includes a cam shower for supplying the oil to a cam shaft.

In the oil supply apparatus for a vehicle in which the bubble separating unit includes the vibration generating unit, it is preferable that the vibration generating unit is provided to be in contact with the oil in the volume portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An oil supply apparatus for a vehicle, comprising:
an oil pump that supplies oil in an oil pan that stores the oil circulating in an engine;
an oil supply passageway that supplies the oil from the oil pump to a lubricating part and a hydraulic actuating part of the engine; and
a bubble separating unit that is provided in the oil supply passageway and separates bubbles contained in the oil,
wherein the bubble separating unit includes a volume portion provided in the oil supply passageway and having a predetermined flow path cross-sectional area, and
wherein the volume portion is disposed at a branch portion of the oil supply passageway which is divided into the hydraulic actuating part and the lubricating part, and the volume portion is configured to supply the hydraulic actuating part with the oil from which the bubbles are separated, and supply the lubricating part with the oil containing a predetermined amount of separated bubbles.

2. The oil supply apparatus according to claim 1,
wherein the oil supply passageway includes:
a first oil passageway that supplies the oil from the oil pump to the volume portion;
a second oil passageway that connects the volume portion and the hydraulic actuating part to each other; and
a third oil passageway that connects the volume portion and the lubricating part to each other, and
a connecting portion between the second oil passageway and the volume portion is disposed below a connecting portion between the first oil passageway and the volume portion.

3. The oil supply apparatus according to claim 2,
wherein a connecting portion between the third oil passageway and the volume portion is disposed at a same height as or above the connecting portion between the first oil passageway and the volume portion.

4. The oil supply apparatus according to claim 2,
wherein a cross-sectional area of a boundary portion between the volume portion and the first oil passageway is larger than a cross-sectional area of the first oil passageway.

5. The oil supply apparatus according to claim 1,
wherein the bubble separating unit is disposed at an upstream side from the hydraulic actuating part in the oil supply passageway.

6. The oil supply apparatus according to claim 1,
wherein the hydraulic actuating part includes a variable valve timing mechanism and a lash adjuster.

7. The oil supply apparatus according to claim 1,
wherein the lubricating part includes a cam shower for supplying the oil to a cam shaft.

8. An oil supply apparatus for a vehicle, comprising:
an oil pump that supplies oil in an oil pan that stores the oil circulating in an engine;
an oil supply passageway that supplies the oil from the oil pump to a lubricating part and a hydraulic actuating part of the engine; and
a bubble separating unit that is provided in the oil supply passageway and separates bubbles contained in the oil,
wherein the bubble separating unit includes
a volume portion provided in the oil supply passageway and having a predetermined flow path cross-sectional area, and
a vibration generating unit disposed in the volume portion,
wherein the volume portion is disposed at a branch portion of the oil supply passageway which is divided into the hydraulic actuating part and the lubricating part, and the volume portion is configured to supply the hydraulic actuating part with the oil from which the bubbles are separated, and supply the lubricating part with the oil containing a predetermined amount of separated bubbles.

9. The oil supply apparatus according to claim 8,
wherein the oil supply passageway includes:
a first oil passageway that supplies the oil from the oil pump to the volume portion;
a second oil passageway that connects the volume portion and the hydraulic actuating part to each other; and
a third oil passageway that connects the volume portion and the lubricating part to each other, and
a connecting portion between the second oil passageway and the volume portion is disposed below a connecting portion between the first oil passageway and the volume portion.

10. The oil supply apparatus according to claim 9,
wherein a connecting portion between the third oil passageway and the volume portion is disposed at a same height as or above the connecting portion between the first oil passageway and the volume portion.

11. The oil supply apparatus according to claim 10,
wherein a cross-sectional area of a boundary portion between the volume portion and the first oil passageway is larger than a cross-sectional area of the first oil passageway.

12. The oil supply apparatus according to claim 8,
wherein the bubble separating unit is disposed at an upstream side from the hydraulic actuating part in the oil supply passageway.

13. The oil supply apparatus according to claim 8,
wherein the hydraulic actuating part includes a variable valve timing mechanism and a lash adjuster.

14. The oil supply apparatus according to claim 8,
wherein the lubricating part includes a cam shower for supplying the oil to a cam shaft.

15. The oil supply apparatus according to claim 8,
wherein the vibration generating unit is provided to be in contact with the oil in the volume portion.

* * * * *